(12) United States Patent
Heffernan et al.

(10) Patent No.: US 8,161,589 B1
(45) Date of Patent: Apr. 24, 2012

(54) LIFT RAMP

(76) Inventors: Robert B. Heffernan, Pittsburgh, PA (US); Joseph F. Llewellyn, Waxhaw, NC (US); Kirit Patel, Lakeland, FL (US); James Finley Taylor, Lake City, FL (US)

(*) Notice: Subject to any disclaimer, the term of this patent is extended or adjusted under 35 U.S.C. 154(b) by 0 days.

(21) Appl. No.: 13/027,426

(22) Filed: Feb. 15, 2011

(51) Int. Cl.
*E01D 1/00* (2006.01)
(52) U.S. Cl. ........................................... 14/71.3
(58) Field of Classification Search ............ 14/71.3, 14/71.7; 187/200
See application file for complete search history.

(56) References Cited

U.S. PATENT DOCUMENTS

| | | | |
|---|---|---|---|
| 2,689,965 A * | 9/1954 | Fenton | 14/71.7 |
| 3,064,289 A * | 11/1962 | Burch et al. | 14/71.3 |
| 3,117,332 A | 1/1964 | Kelley et al. | |
| 3,137,017 A | 6/1964 | Pfleger et al. | |
| 3,201,813 A * | 8/1965 | Le Clear | 14/71.7 |
| 3,671,990 A | 6/1972 | Hovestad | |
| 3,694,840 A * | 10/1972 | Loblick | 14/71.7 |
| 3,699,601 A | 10/1972 | Hecker, Jr. et al. | |
| 3,806,976 A * | 4/1974 | Yoon | 14/71.3 |
| 4,257,136 A * | 3/1981 | Loblock | 14/71.3 |
| 4,411,037 A * | 10/1983 | Terrien et al. | 14/2.6 |
| 4,525,887 A * | 7/1985 | Erlandsson et al. | 14/71.3 |
| 4,531,248 A | 7/1985 | Swessel et al. | |
| 4,689,846 A * | 9/1987 | Sherrod | 14/71.3 |
| 4,995,130 A * | 2/1991 | Hahn et al. | 14/71.3 |
| 5,111,546 A * | 5/1992 | Hahn et al. | 14/71.3 |
| 5,460,460 A * | 10/1995 | Alexander | 14/71.3 |
| 5,871,329 A | 2/1999 | Tidrick et al. | |
| 5,881,414 A * | 3/1999 | Alexander | 14/71.1 |
| 6,106,191 A | 8/2000 | Achenbach | |
| 6,125,491 A | 10/2000 | Alexander | |
| 6,327,733 B1 | 12/2001 | Alexander et al. | |
| 6,643,880 B1 | 11/2003 | Massey et al. | |
| 6,973,693 B1 | 12/2005 | Mayer et al. | |
| 6,988,289 B2 | 1/2006 | Pedersen et al. | |
| 2005/0102042 A1 | 5/2005 | Reynard et al. | |

* cited by examiner

*Primary Examiner* — Gary S Hartmann
(74) *Attorney, Agent, or Firm* — Ronald Law Group, LLC; Carl A. Ronald

(57) ABSTRACT

An adjustable ramp apparatus installed as part of a flat surface, such as a deck, adapted for angular elevation to an inclined position for providing a ramp between the platform level and the entryway door sill level of a trailer-type home. The apparatus is elevated by means of an actuator-driven mechanical linkage located under the surface of the primary ramp platform adjacent to the trailer type home or structure. When the actuator is disengaged, the ramp returns to a lowered position so that the door to the home is not blocked. An alternative embodiment includes a secondary threshold ramp located beneath the surface of the primary ramp platform that moves into place as the apparatus is actuated to fill the gap between the door sill and the elevated primary ramp platform.

14 Claims, 4 Drawing Sheets

LIFT RAMP

FIELD OF THE INVENTION

This invention relates generally to a ramp structure for disabled individuals, and more particularly, to a new and improved adjustable ramp for access to a trailer-type home.

BACKGROUND OF THE INVENTION

It is well known and widely reported that the average age of Americans has been gradually increasing as families are having fewer children and people are living longer. Recently, there has also been an increasing amount of press coverage about the rising average weight and sedentary lifestyle of Americans. The combination of these factors has made older people less agile and more injury-prone, which has lead to an increased need for wheelchairs and walkers.

Trailer homes, also called mobile homes, are prefabricated structures that are built in a factory and delivered to the location where they will be used. These types of homes are quite common with there being an estimated 38,000 mobile home communities in the United States. Trailer homes aren't built on the spot where they will eventually rest, and, as a result, plumbing, piping, heating and electrical are placed beneath it, which causes the home to be placed in an elevated position. In addition, the topography of the lot upon which the trailer home will ultimately be placed is unknown at the time of manufacture and it is almost always the case that a staircase and a platform or deck needs to be built in order to facilitate access to the home.

When trailer homes are manufactured, however, the manufacturer places a weather stripping section below the exterior door that extends a few inches below the door sill. Additionally, it is often the case that the door frame extends away from the exterior of the trailer home because they have thin walls to maximize interior space and don't really have room for a six to eight inch door frame. Therefore, in order to open the door, any deck or porch that is built outside the unit must accommodate the weather stripping and any external portion of the door framing and the result is that the platform or deck is several inches below the door sill or interior flooring. For young and agile folks, this height difference is of little importance because they can easily see the height difference and simply step up into the trailer upon entry. People who are wheelchair bound, need to use a walker, have reduced mobility or reduced visual acuity, on the other hand, may have difficulty safely navigating this elevation difference.

Trailer homes are not standard; some are constructed with doors that open inward while others open in an outward direction. Moreover, many of the trailer homes constructed without doors that open inwards also have storm doors on the outside opening outward. All of these factors combine to collectively rule out a fixed ramp solution to the problem.

It is known in the art to provide ramps to enable disabled individuals to get in and out of motor vehicles. Typically, these types of ramps are designed to allow individuals in wheelchairs pass from a lower plane to a higher plane and are equipped with powered mechanism that allows the ramp to move from a lowered position flush without the surrounding platform to the proper elevated position. While these types of ramps are powered and generally provide vehicular access, they have several distinct disadvantages including weight, position of storage, use during power failure, and modifications necessary for installation and use. Moreover, these systems suffer from the requirement of a twelve volt power supply, which may or may not be readily available in a mobile home setting.

It is also known in the art to use dock levelers or dock boards in connection with loading and unloading facilities for trucks. Such devices typically include a ramp which is movable from a horizontal position to an inclined position as well as an extension lip pivotally mounted to the forward of said ramp to engage the bed of the truck. Dock leveling devices, while providing means for moving objects above or below a plane, have a number of disadvantages in the context of the present application. Many dock levelers are for indoor installation and cannot be activated from both inside and outside the building. Furthermore, dock leveling devices disclosed in prior art cannot be used independently by an individual with impaired mobility due to the fact that final adjustments must be made by walking on top of the device to ensure it is at an appropriate level.

Although various types of levelers and ramps presently exist for a variety of uses, none address the specific challenges of the trailer-home application. Therefore, there is a significant need for an adjustable ramp that facilitates access to a trailer type home for people who are physically and/or visually impaired. The present invention satisfies this need by providing a ramp that can be raised to the level of the doorsill or interior floor of the trailer home and also extend forward to bridge the gap between outside edge of trailer home and inside floor, does not block any doors when not in use, can be operated by a disabled person without need for manual adjustment and can do so from inside or outside the home.

SUMMARY OF THE INVENTION

It is an object of the present invention to provide a new and improved means for ingress and egress to trailer or mobile homes by physically or visually compromised individuals that minimizes risk of injury when a structure has a difference in height between the door sill and the exterior floor level. The present invention provides an adjustable ramp that can be elevated and extended so that it is flush with the doorsill or interior floor of a trailer home. The new and improved ramp structure functions not only for wheelchair bound individuals, but reduces encumbrances for all persons of limited mobility.

In one embodiment, the adjustable ramp apparatus of the present invention has a structural pan that sits in an exterior platform such as a deck or porch and supports a primary ramp platform with an extendable linkage that is powered by an actuator to raise a proximal edge of the platform to the level of a door sill to a mobile home or similar structure. The extendable linkage connecting the platform with the floor of the structural pan can include an upper member having a top end and a bottom end and a lower member having a top end and a bottom end, the bottom end of the lower member rotatably disposed on the floor of the structural pan and the top end of the upper member rotatably disposed on the primary ramp platform, and the bottom end of the upper member rotatably connected to the top end of the lower member.

It is an additional object of the invention to provide a secondary threshold ramp that is pivotally attached to a connection member at a first end and rotatably disposed on the upper member of each of the legs at a second end, whereby extension of the linkage causes the secondary threshold ramp to extend beyond the proximal edge and bridge a gap between the raised proximal edge and the mobile home or similar structure.

It is further an object of the present invention to provide an adjustable ramp apparatus that does not block the door of the mobile home in case of a power outage. In an embodiment, the actuator is physically connected to the extendable linkage and includes an air compressor attached to an air cylinder via a hose whereby activation of the air compressor generates air pressure that pushes a piston out of the air cylinder and thereby rotates the pair of legs about the horizontal rod and elevates the primary ramp platform a desired amount. The piston is spring-biased toward the non-extended position, so if the air pressure is discontinued, the piston will automatically be refracted back into the air cylinder, thus lowering the primary ramp platform to a position flush with the floor in which it is installed.

DETAILED DESCRIPTION

In the following detailed description of example embodiments, reference is made to the accompanying drawings, which form a part hereof, and in which is shown by way of illustration, specific embodiments in which the example device and system may be practiced. It is to be understood that other embodiments may be utilized and structural changes may be made without departing from the scope and spirit of this description.

Figure 1:
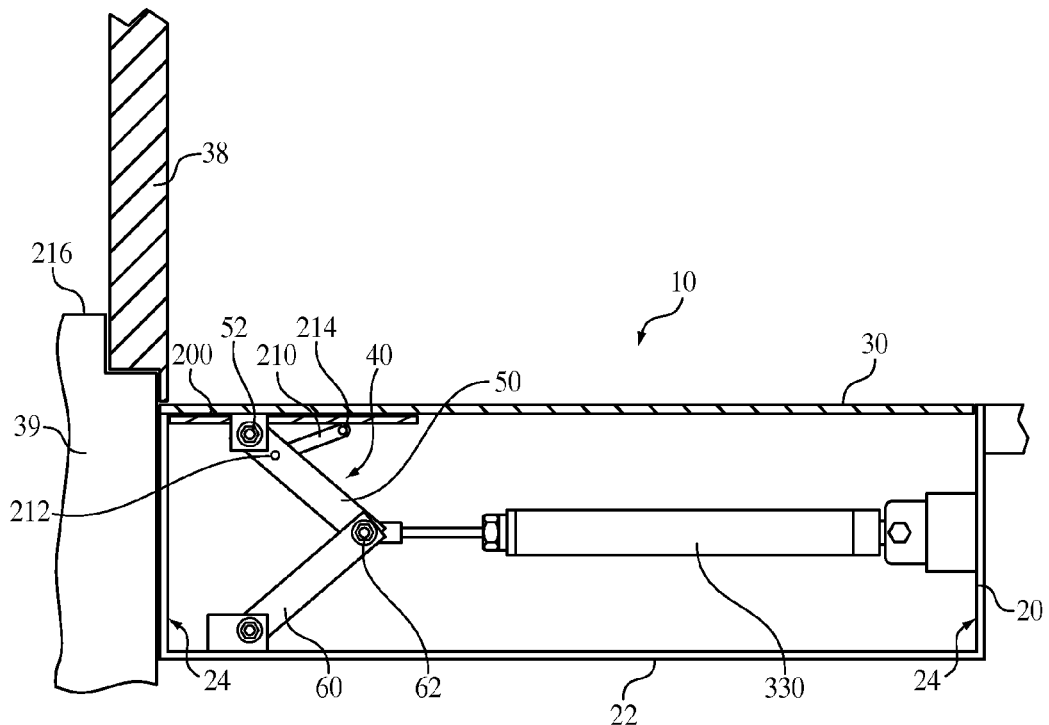
FIG. 1 is a side elevation cut-away view of the apparatus wherein the primary platform is in a lowered position.
Figure 2:
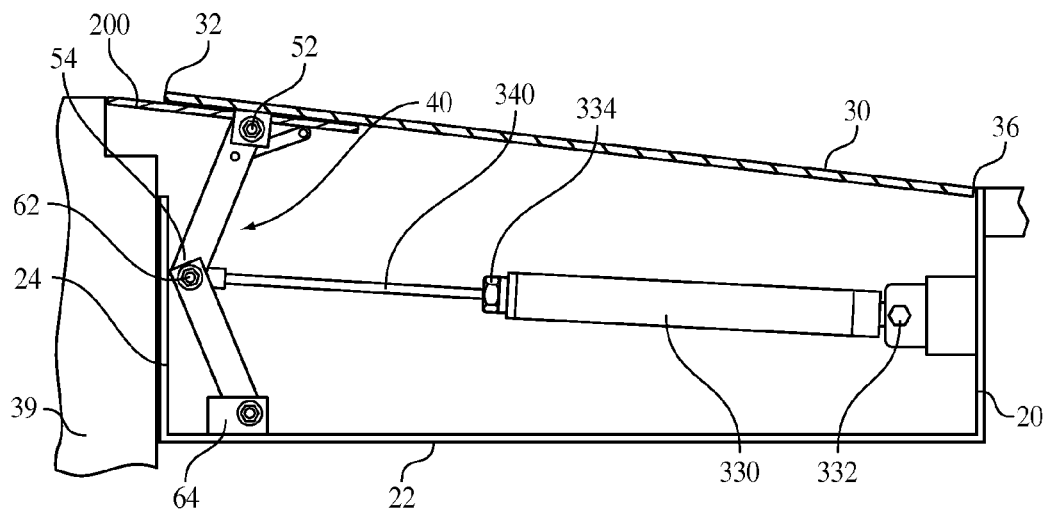
FIG. 2 is a side elevation cut-away view of the apparatus wherein the primary platform is in an elevated position.
Figure 3A:
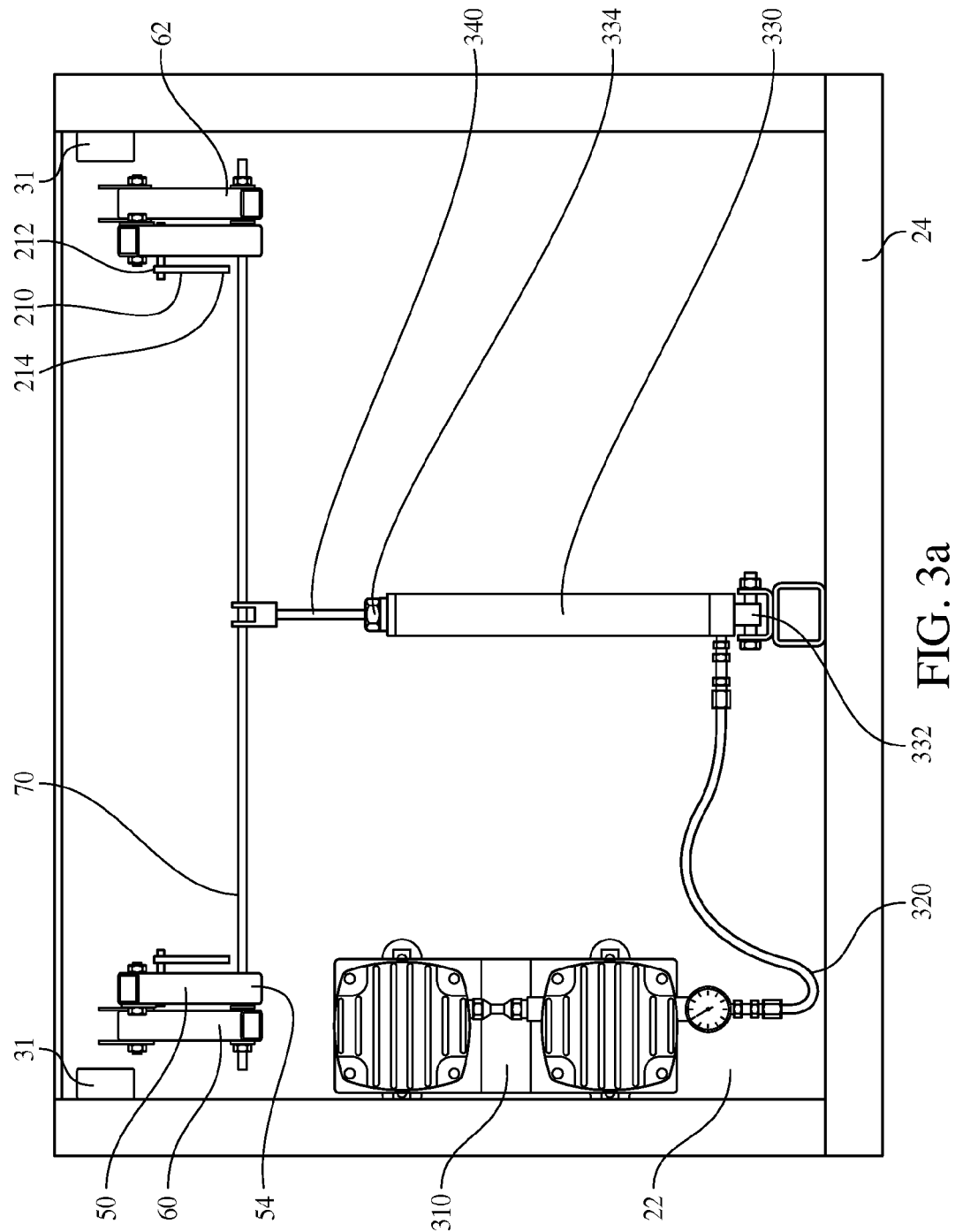
FIG. 3a is a plan cut-away view of the apparatus of the present invention in a lowered position with the primary ramp platform and the threshold ramp removed.
Figure 3B:
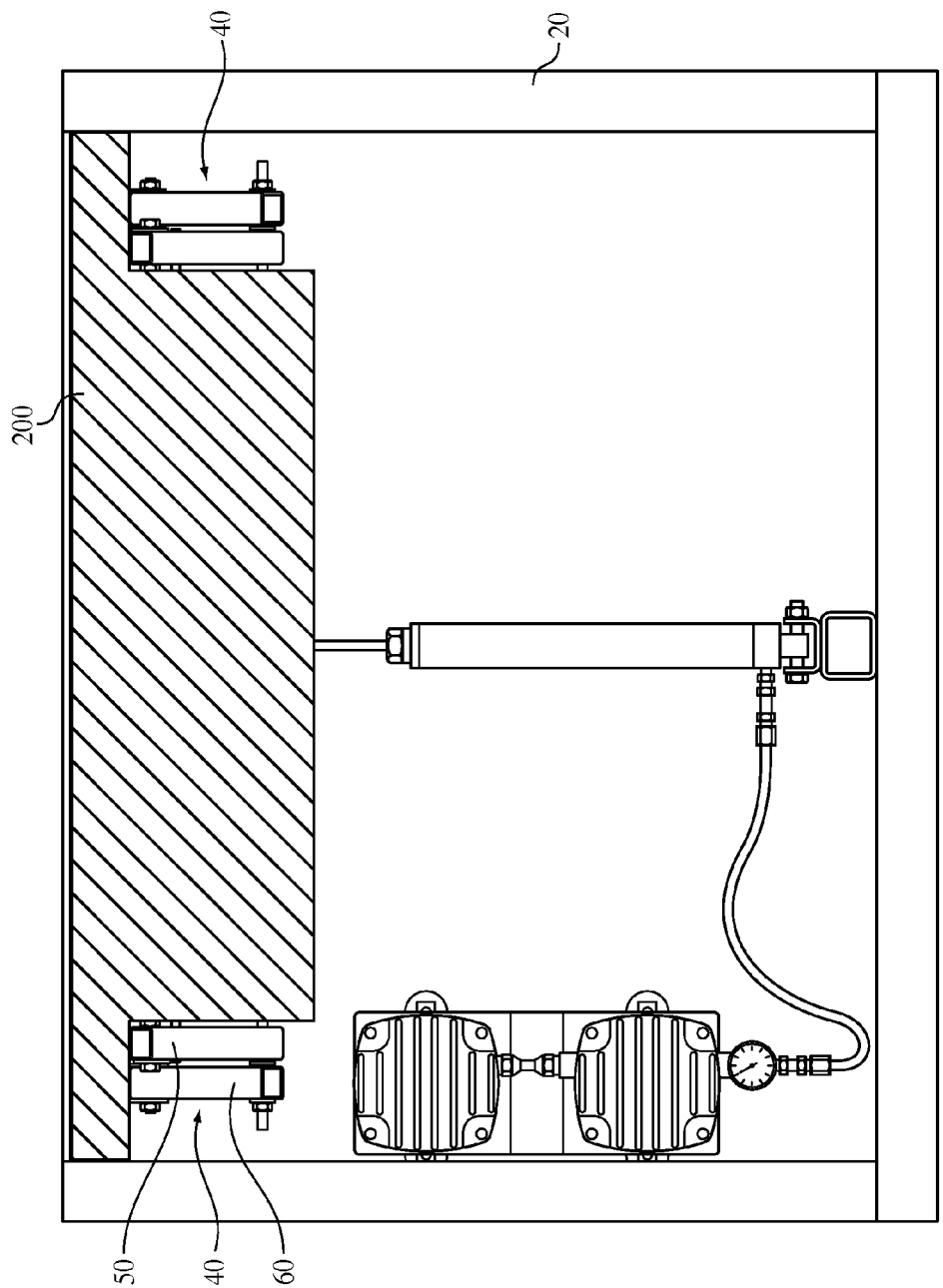
FIG. 3b is a plan view of the device as in FIG. 3a, in a lowered position, but with only the primary ramp platform removed.
Figure 4:
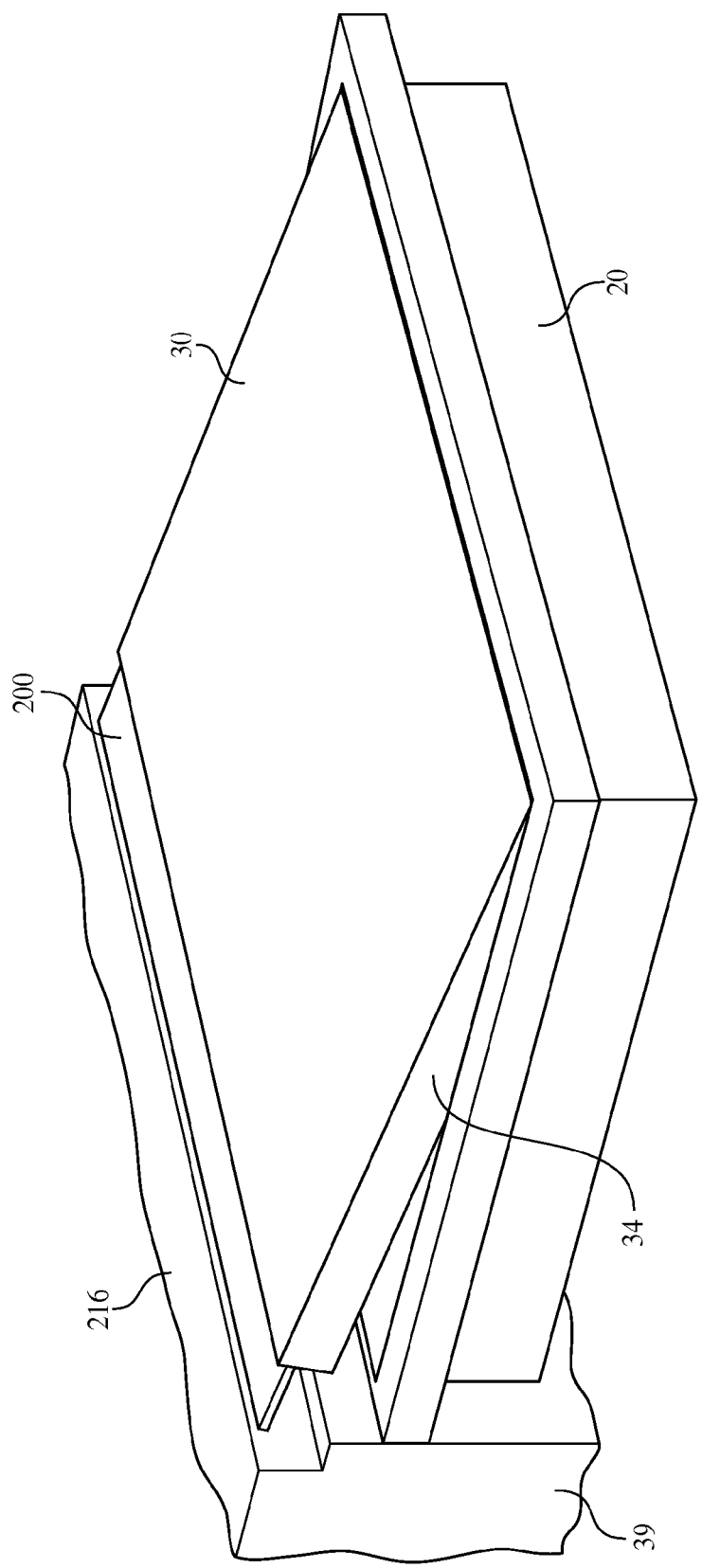
FIG. 4 is a perspective view of the device with the primary platform in an elevated position.

Referring now to FIGS. 1-4, an adjustable ramp apparatus in accordance with a preferred embodiment of the present invention is shown and is generally referred to as number 10. Pursuant to the drawings, the adjustable ramp apparatus 10 includes a structural pan 20 and a primary ramp platform 30 that can be elevated from the structural pan 20 when actuated in accordance with the disclosed embodiment. The structural pan 20 having a floor 22 and a plurality of walls 24.

The primary ramp platform 30, having a proximal edge 32, side edges 34, and a distal edge 36, the proximal edge 32 being closest to a door 38 of a trailer home or other raised structure 39, is attached to the structural pan 20 by a pair of legs 40, which are mirror images of each other. Each leg 40 has an upper member 50 and a lower member 60. A top end 52 of each upper member 50 is rotatably disposed on the primary ramp platform 30 near the proximal edge 32. A bottom end 54 of each upper member 50 is rotatably connected to a horizontal rod 70 which not only rotatably connects both the upper and lower members 50, 60 of each leg, but also connects the legs 40 to each other for added stability and to provide a single point of actuation as will be further explained. Much like the upper member 50, a top end 62 of the lower member 60 of each leg 40 is also rotatably attached to the horizontal rod 70 and a bottom end 64 of the lower member 60 of each leg 40 is rotatably connected to the floor 22 or, alternatively, the wall 24 of the structural pan 20.

Referring primarily now to FIGS. 1-3b, in accordance with a presently preferred embodiment, the proximal edge 32 of the primary ramp platform 30 can be raised by activating an air compressor 310 disposed on the floor 22 of the structural pan 20. The air compressor 310 is connected to an air cylinder 330 by a hose 320 in order to deliver pressurized air necessary to raise the ramp platform 30. The air cylinder 330 has a first end 332 that is hingedly disposed on the structural pan wall 24 supporting the distal edge 36 of the primary ramp platform 30 and houses a piston 340 that extends between a second end 334 of the air cylinder 330 and the horizontal rod 70 between the legs 40.

When the apparatus 10 is activated, the air compressor 310 forces air through the hose 320 into the first end 332 of the air cylinder 330, forcing the piston 340 to push against the horizontal rod 70. When the horizontal rod 70 is pushed by the piston 340, it forces the legs 40 to rotate around the rod 70, which, in turn, causes the primary ramp platform 30 to be raised at its proximal edge 32 as is shown more particularly in FIG. 2. In this raised position, the top end 62 of the lower member 60 and the bottom end 54 of the upper member 50 are both resting in an overcenter position against the wall 24 of the structural pan 20 adjacent to the proximal edge 32 of the primary ramp platform 30. As a result, the elevated primary ramp platform 30 and any weight placed on top of it, by a person in a wheelchair for example, is fully supported by the legs 40 buttressed against the wall 24 of the structural pan 20 and the air cylinder 330 is not required to bear any of this load. When the primary ramp platform 30 is in this position, its proximal edge 32 is elevated to roughly the combined height of the legs 40, enabling access to the home 39.

The apparatus 10 can be activated by means of remote, or permanently mounted switches or buttons. Furthermore, the scope of the invention is not limited to solely pneumatic means as will be readily apparent to those skilled in the art. Certainly, the preferred embodiment can be adapted to work with motors or other mechanical or electro-mechanical means to raise the proximal edge 32 of the primary ramp platform 30.

When the primary ramp platform 30 is no longer needed, the compressor 310 is turned off and the piston 340 slowly retracts back into the cylinder 330 via a spring mechanism (not shown). The cylinder 330 and piston 340 combination can be a spring return cylinder of the type typically seen on screen doors or an external spring can be added to the apparatus to facilitate retraction of the piston 340. The movement of the piston 340 back into the air cylinder 330 pulls the horizontal rod 70 away from the structural pan wall 24 and causes the legs 40 to rotate on a horizontal axis and the primary ramp platform 30 to lower until it rests on a pair of supports 31 disposed on the walls 24 of the structural pan 20. In an alternative embodiment, the pair of supports 31 is replaced with a support beam (not shown) that spans the entire width of the platform. Additionally, another alternative embodiment has the apparatus 10 being supported by a larger platform or deck (not shown) in which the apparatus is placed. The structure of this alternative support can be cross members, struts, or any other means of supporting the apparatus within a deck or platform as may be readily apparent to those skilled in the art. The primary ramp platform 30 is completely lowered when it is flush with the surrounding platform surface (not shown).

In an alternative embodiment, the adjustable ramp apparatus 10 includes a secondary threshold ramp 200 located beneath the primary ramp platform 30. The secondary threshold ramp 200 is connected to the upper members 50 via a set of third members 210 that are rotatably disposed on the upper members 50 at a first end 212 and also rotatably disposed on the secondary threshold ramp 20 at a second end 214. When the primary ramp platform 30 is in a lowered position, the threshold ramp 200 does not extend beyond the proximal edge 32 of the primary ramp platform 30. When the primary ramp platform 30 is elevated to a raised position, the threshold ramp 200 is forced to partially slidably extend from under the primary ramp platform 30 and bridge a gap between the proximal edge 32 of the primary ramp platform 30 and a door sill 216.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. Accordingly, the drawings and description are to be regarded as illustrative in nature, and not as restrictive.

We claim:

1. An adjustable ramp apparatus adapted to facilitate entry into a mobile home from an exterior flat surface that is at a different height comprising: a structural pan having a proximal wall, a distal wall, and a floor; a primary ramp platform having a proximal edge adjacent to the proximal wall of the structural pan and a distal edge pivotally disposed on the distal wall of the pan; an extendable linkage connecting the platform and the floor; and an actuator connecting the linkage and the pan; the actuator being powered to extend the linkage and raise the platform; whereby the linkage contacts the proximal wall to support the platform when raised.

2. The adjustable ramp apparatus of claim 1, wherein the extendable linkage is comprised of: a plurality of legs, where each leg is connected pivotally at one end to the pan and at the other end to the primary ramp platform to support the platform for elevational movement with respect to the floor.

3. The adjustable ramp apparatus of claim 2, wherein each of the plurality of legs is comprised of an upper member having a top end and a bottom end and a lower member having a top end and a bottom end, the bottom end of the lower member rotatably disposed on the structural pan and the top end of the upper member rotatably disposed on the primary platform, and the bottom end of the upper member rotatably connected to the top end of the lower member forming a pivoting connection; whereby activation of the actuator causes the pivoting connection to rotate to an overcenter position whereby the pivoting connection contacts the proximal wall of the structural pan to support the primary platform.

4. The adjustable ramp apparatus of claim 3, further comprising a secondary threshold ramp slidably captured below the primary ramp platform adjacent to the proximal edge for bridging a gap created between the proximal edge of the primary ramp platform and the mobile home when the platform is raised.

5. The adjustable ramp apparatus of claim 4, wherein the secondary threshold ramp is pivotally attached to a connection member at a first end and rotatably disposed on the upper member of each of the legs at a second end, whereby extension of the linkage causes the secondary threshold ramp to extend beyond the proximal edge and to bridge a gap between the proximal edge and the mobile home.

6. The adjustable ramp of apparatus of claim 3, wherein the actuator comprises a rod connecting the bottom end of the upper member and the top end of the lower member of each of the plurality of legs to each other; and an air cylinder housing a piston having a captured end and an exposed end, said piston being slidably movable between a resting position an extended position, the exposed end being disposed on the rod; whereby movement of the piston from the resting position to the extended position causes the linkage to extend and raise the platform.

7. The adjustable ramp apparatus of claim 6, wherein the actuator is powered by a pneumatic means.

8. The adjustable ramp apparatus of claim 7, wherein the pneumatic means is an air compressor.

9. The adjustable ramp apparatus of claim 6, wherein the actuator further comprises: an air compressor attached to the air cylinder via a hose whereby activation of the air compressor generates air pressure that pushes the piston out of the air cylinder to the extended position and thereby rotates the pair of legs about the rod and elevates the primary ramp platform a desired amount.

10. The adjustable ramp apparatus of claim 9, wherein the piston is spring biased to the resting position whereby deactivation of the air compressor causes the primary ramp platform to return to a lowered position.

11. The adjustable ramp apparatus of claim 1, wherein said structural pan is installed in the exterior flat surface such that when the primary ramp platform is in a lowered position, the primary ramp platform is level with the exterior flat surface.

12. The adjustable ramp of claim 1, wherein the actuator is selected from a group consisting of hydraulics, pneumatics, mechanical levers, solenoids, linear actuators, rotary actuators and stepper motors.

13. The adjustable ramp apparatus of claim 1, further comprising a secondary threshold ramp for bridging a gap created between the proximal edge of the primary ramp platform and the mobile home when the platform is raised.

14. The adjustable ramp apparatus of claim 13, wherein the secondary threshold ramp is pivotally attached to a connection member at a first end and rotatably disposed on the extendable linkage at a second end, whereby extension of the linkage causes the secondary threshold ramp to extend beyond the proximal edge and to bridge a gap between the proximal edge and the mobile home.

* * * * *